Figure 1:
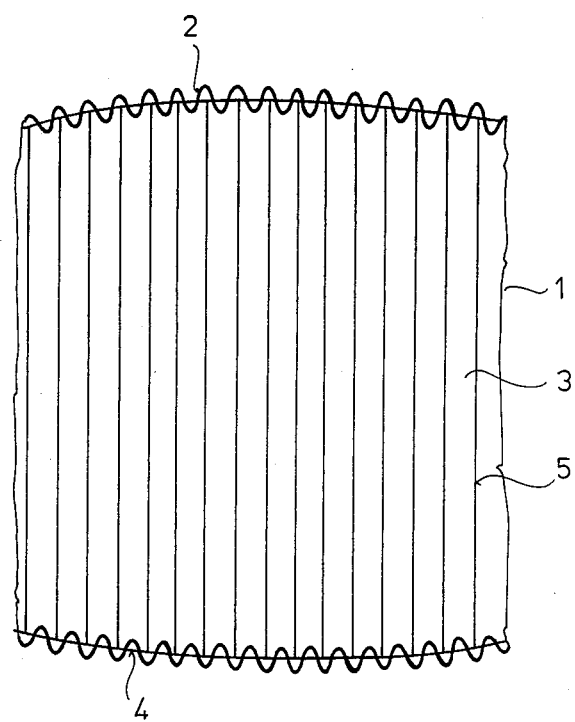

United States Patent

Tatay et al.

[11] Patent Number: 4,570,964
[45] Date of Patent: Feb. 18, 1986

[54] ELASTIC SELF CARRYING BELLOWS

[75] Inventors: Ilona Tatay; Gusztáv Gündisch; Jenó Mádi; László Palotás; Gyula Subotics, all of Budapest, Hungary

[73] Assignee: Taurus Gumiipari Vállalat, Hungary

[21] Appl. No.: 502,161

[22] Filed: Jun. 8, 1983

[30] Foreign Application Priority Data

Jul. 8, 1982 [HU] Hungary .............................. 2227/82

[51] Int. Cl.⁴ .............................................. B06D 5/00
[52] U.S. Cl. .................................... 280/403; 280/408; 280/432; 428/167; 428/181
[58] Field of Search ................ 493/940, 941; 428/167, 428/181, 182; 280/403, 408, 432

[56] References Cited

U.S. PATENT DOCUMENTS 3,809,199  5/1974  Bessiere ........................... 493/941 X
3,948,712  4/1976  Stannard ........................... 493/941 X
4,247,128  1/1981  Knapp et al. ....................... 280/403

FOREIGN PATENT DOCUMENTS 389005  6/1965  Switzerland ......................... 280/403

Primary Examiner—George F. Lesmes
Assistant Examiner—Nancy A. B. Swisher

[57] ABSTRACT

The invention relates to an elastic self-carrying bellows-body, in particular for vehicles, having been formed with ribs separated by spacings and interconnected with connecting means.

The essence of the invention lies in that the thickness of the connecting means interconnecting the ribs is less on at least two opposite sides of the bellows-body, than that of the ribs and the ribs and connecting means are formed as monolithic units.

10 Claims, 5 Drawing Figures

ELASTIC SELF CARRYING BELLOWS

The invention relates to elastic self-carrying bellows in particular for vehicles, which are formed with ribs mutually separated by spacings and connected with connecting means.

From technical literature diverse bellows are known for confining the space between the bodies of two connected vehicles at least on three sides.

So e.g. articulated busses used to be provided with bellows, which are sewn from a cloth coated with a flexible synthetic material and the outer contour of which follows the outline of the body of the articulated bus. The ribs having been cut and sewn for the bellows do not assure self-keeping, self-carrying of the bellows, so they are provided with an extra reinforcement along the stitching. A further disadvatageous feature of the solution lies in that the stresses arising in the course of drawing apart the bellows cause a permanent deformation in the inserts made of metal.

From the patent HU-PS No. 171 185 elastic bellows made of textile-elastomer are known. The essence of this solution lies in that at least at the elements assuring self-carrying the bellows are formed of at least two textile-layers and the elastomer layer lying inbetween; furtheron the profile-width of the vertical ribs is preferably constant, while in dependence of the dimensions of the bellows, from the connection of the horizontal ribs advancing towards the vertical symmetry-axis of the bellows said profile-width continuously decreases; at the same time the vertical and horizontal ribs are interconnected with a circular arc with a pre-determined radius and in a given case the outer and/or inner edges are provided with a reinforcement made of a profiled cord.

Another solution—being similar to the specified one—is also well known, with which one, three or even more layers containing properly oriented elementary fibres are used and at least 60% of the elementary fibres are of the same orientation. With this solution the elementary fibres are more embedded in rubber, and accordingly interlacing points exert less shearing forces.

The common deficiency of both of the solutions mentioned lies in their production requiring a considerable live labour, as only manual manufacturing is possible, involving a lot of error sources. The deficiencies fundamentally influence the usefull life of the bellows and the aesthetic appearance thereof.

A further disadvantageous feature lies in that the bellows are composed of single elements cut out of sheet material, accordingly, a considerable waste is produced far increasing productional costs.

From Italian technical literature extruded bellows made without a textile-carcasse are also known, the essence of which lies in that the ribs are mainly hollow and are interconnected by connecting means.

The deficiency of this solution appears in the slight- —scarcely twofold—extensibility; costs of production are high; due to the large dimensions the bellows can be used but under special conditions, so they are not widely used.

The aim of our invention is to eliminate said deficiencies i.e. to develop elastic self-carrying bellows, which can be produced in an easy manner and at low costs, the extensibility meeting even extreme requirements; further requirements lie in that the ribs should be small-sized; usual and cheap basic materials could be used; design should be simple and simultaneously aesthetic; special expenditures and preparatory works are not needed, working with a high operational safety and having at least the same useful life as the known solutons, if possible, even longer.

The invention is based on the recognition that by using synthetic materials, expediently polyurethane foam material as a basic material and by a more simple structural design the aim set can be achieved.

The aim set is achieved in case of the elastic self-carrying bellows—as described above—in such a manner that the thickness of the connecting means connecting the ribs is less, than that of the ribs at least on two opposite sides of the bellows, furtheron, the ribs and the connecting means are formed as monolithic units.

The majority of the bending stresses arising in the course of opening and closing the ribs is taken up in the range, where the adjacent ribs meet, in which—in order to decrease the bending stresses caused by the considerable bending and as a consequence, to prolongate useful life—a preferred embodiment is used, with which at least on one side the cross-section of the connecting means is confined by an arc; furtheron the theoretical geometric cconfigurations being characteristic for the arched parts of the connecting means have coinciding symmetry-points or are displaced in relation to each other, at least in the joining range of the longitudinal sides the ribs are diminished.

In order to promote mechanization of production and to facilitate assembly, disassembly and exchange, with a preferred embodiment, at least at one place transversely to the ribs it is divided and at the ends thereof an outermost rib each is formed.

With a further preferred embodiment in order to assure close connection with the vehicle body the bellows-bodies are assembled of at least two pieces.

With another preferred embodiment—facilitating production—in the two outermost ribs a Bowden-cable is inserted.

Figure 2:
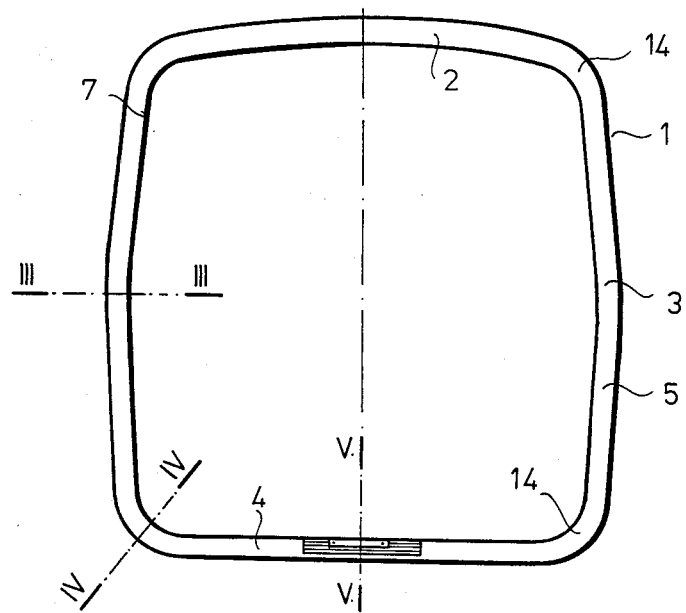
Figure 3:
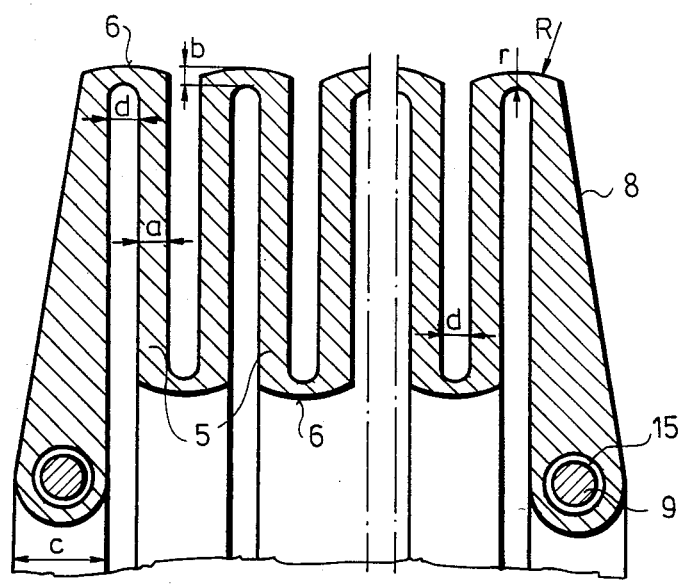
Figure 4:
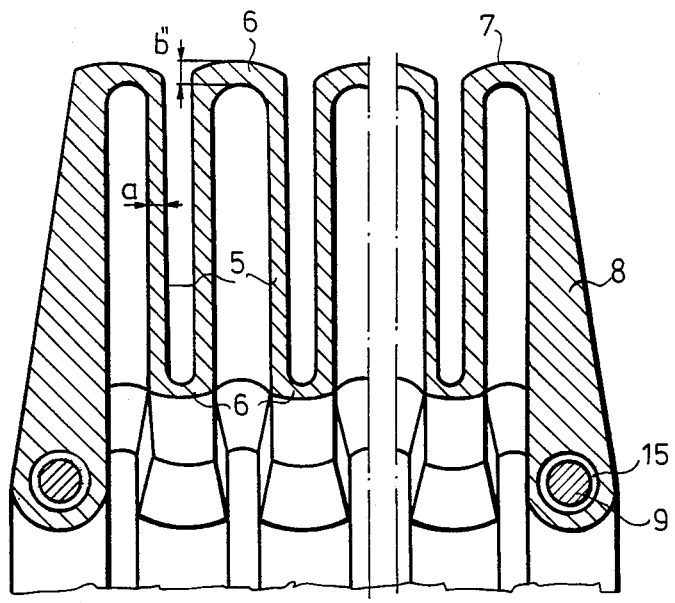
Figure 5:
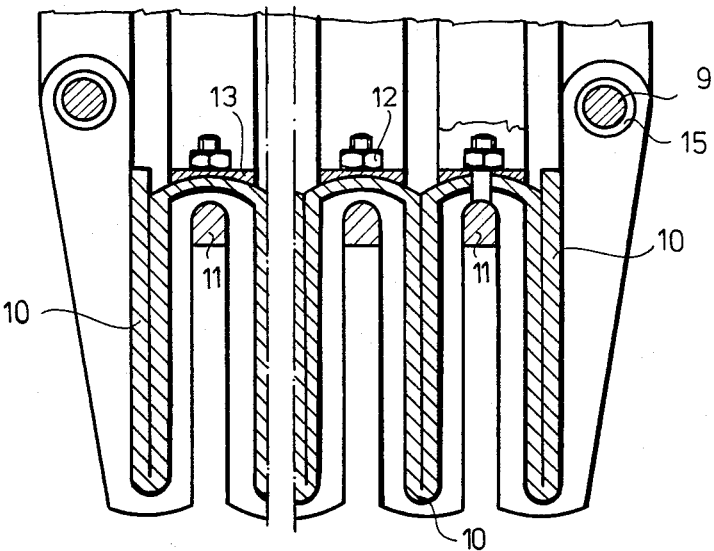

The invention will be described in detail by means of a preferred embodiment, by the aid of the drawing enclosed, wherein FIG. 1 gives a schematical side-view of the elastic self-carrying bellows according to the invention, FIG. 2 is the frontal view thereof, FIG. 3 is a section taken along the line III—III, FIG. 4 a section taken along the line IV—IV, and FIG. 5 a section taken along the line V—V.

The self-carrying elastic bellows-body 1 according to the invention is formed with an upper arch 2, two side walls 3, and a lower arch 4, which are formed with the ribs 5. In the vertical symmetrical axis of the elastic self-carrying bellows-body 1 the ribs 5 are divided and are interconnected by means of the connecting means 6. The ribs 5 are arranged with the spaces d and are elastically interconnected with the connecting means 6, i.e. they are formed of one piece. In general, the thickness a of the ribs 5 is larger, than the smallest thickness b of the connecting means 6.

The elastic self-carrying bellows-body 1 according to the invention is provided on both ends with an outermost rib 8 each, incorporating the synthetic pipe 15 and the Bowden-cable 9 therein. The elastic self-carrying bellows-body 1 is fixed to the connected body of the bus along the outermost ribs 8 in a manner known in itself.

The thickness of the connecting means 6 is formed in the range between the outer curvature and the inner curvature, where it has the less thickness b.

On the place of division the ribs 5 are interconnected by the connecting means 6, which is formed of the stiffening bars 11 provided with the screws 12—as the clamping plate 13—, the stiffening bar 11 is inserted between the two ribs 5 of the elastic self-carrying bellows-body 1. The screws 12 are welded onto the stiffening bars 11 and pass through the bore having been formed in the connecting means 6 of the two ribs 5; the flexible sheet 10 protecting against dust, the clamping sheet 13 and the screws 12 are fixed with nuts.

The connecting means 6 may have a cross-section, wherein on the outer and/or inner side it is formed with at least one arc with identical and/or different radius, while the part without the arc is formed of a straight portion. In case of too large dimensions, as it is the case with the embodiment illustrated here, the ribs are thinned in the corner-range 14; as a consequence, the stresses arising in the course of the motions in the corner-ranges 14 can be considerably decreased, whereby the useful life of the bellows according to the invention can be well prolonged.

The elastic self-carrying bellows-body 1 according to the invention can be produced in pieces symmetrically divided and perpendicularly to the ribs 5. In this case the single pieces are joined into one organic unit in a manner known in itself, e.g. by glueing. In such a manner production can be considerably facilitated.

In the case of divided elastic self-carrying bellows-bodies 1 division is preferably performed along the plane passing through the vertical symmetry axis and lying perpendicularly to the ribs 5 forming the arch 4. The divided parts are interconnected by means of the connecting means 6 already mentioned.

It seems to be expedient to perform division along the plane running perpendicularly to the ribs 5 forming the arch 4 and passing through the vertical symmetry axis of the elastic self-carrying bellows-body 1, because the slightest motions arise just in said range, accordingly, load of the connecting device can be decreased and as a consequence, useful life thereof can be prolonged.

The elastic self-carrying bellows-body 1 was cast from foamed polyurethane, having a density of 0.9 g/cm$^3$, the hardness was about 95 Shore. Any other basic material may be suitable; the most essential requirement lies in that high limit values of fatigue, proper hardness assuring self-carrying, sufficient elasticity and a lightweight structure could be achieved.

The elastic self-carrying bellows-body 1 according to the invention is at least tentimes more extensible than the known solutions.

What we claim:

1. An elastic self-carrying bellow-body in particular for articulated wheeled vehicles for connecting one part of such vehicle to another part of that vehicle and permitting those vehicle parts to move with respect to each other, the bellow-body having an upper arch, a transverse axis, two side walls and a lower arch with the upper and lower arches being similar to each other and the two side walls being similar to each other, said bellow-body having a longitudinal axis and ends each of which is adapted to be connected to a portion of a vehicle body to couple vehicle body portions together, characterized in that said bellow-body side walls and arches include a multiplicity of ribs which are spaced apart along the longitudinal axis of the bellow-body each of said ribs having a thickness dimension and interconnecting means connecting adjacent ribs of said multiplicity of ribs, said interconnecting means being monolithic with said adjacent ribs so that said bellow body is monolithic and having a thickness dimension less than said rib thickness dimension whereby bending stresses arising from opening and closing of the bellow-body are principally taken up by said interconnecting means so the bellow-body is very expandable and contractable.

2. Elastic self-carrying bellows-body as claimed in claim 1 or 2, characterized in that the theoretical geometric configurations characterizing the arched parts of the connecting means /6/ have coinciding symmetry points.

3. Elastic self-carrying bellows-body as claimed in claims 1 or 2, characterized in that the body is divided at least at one place transversely to the ribs.

4. Elastic self-carrying bellow-body as claimed in, claim 1 characterized in that the body includes at least two monolithic parts.

5. The elastic self-carrying bellow-body as claimed in claim 1 wherein, in a relaxed condition of the bellow-body, adjacent ribs are essentially parallel to each other within said bellow body.

6. The elastic self-carrying bellow-body as claimed in claim 5 wherein said ribs are planar on opposite sides threof and said connecting means has a first arcuate surface connecting said rib planar sides.

7. The elastic self-carrying bellow-body as claimed in claim 6 wherein said connecting means includes a further arcuate surface connecting said adjacent ribs together, said further arcuate surface being spaced from said first arcuate surface by the thickness dimensions of said connecting means.

8. The elastic bellow-body as claimed in claim 1 characterized in that said multiplicity of ribs includes end ribs located on each end of the bellow-body with said end ribs having planar sides with a first side being essentially parallel to an adjacent rib side and another side converging toward said first side.

9. Elastic self-carrying bellow-body as claimed in claim 8, characterized in that a Bowden-cable is inserted in the two end ribs.

10. The elastic self-carrying bellow-body as claimed in claim 1 in which the longitudinal extent of each of said ribs is transverse of the longitudinal extent of the bellow-body whereby movement of adjacent ribs toward or away from each other shortens or lengthens the bellow-body respectively.

* * * * *